United States Patent [19]
Tateishi et al.

[11] Patent Number: 5,903,530
[45] Date of Patent: May 11, 1999

[54] APPARATUS FOR REPRODUCING RECORD INFORMATION OF MULTIPLE-LAYERED OPTICAL DISC

[75] Inventors: Kiyoshi Tateishi; Kazuo Takahashi, both of Saitama-ken, Japan

[73] Assignee: Pioneer Electronic Corporation, Tokyo-to, Japan

[21] Appl. No.: 08/964,219

[22] Filed: Nov. 4, 1997

[30] Foreign Application Priority Data

Jun. 11, 1996 [JP] Japan ..................................... 8-309989

[51] Int. Cl.⁶ ........................................................ G11B 7/09
[52] U.S. Cl. .................................... 369/44.27; 369/44.29; 369/44.25; 369/94
[58] Field of Search ................................... 369/94, 44.25, 369/44.27, 44.29, 44.35, 54, 58

[56] References Cited

U.S. PATENT DOCUMENTS

| | | | |
|---|---|---|---|
| 5,682,372 | 10/1997 | Yamakawa et al. | 369/44.25 |
| 5,740,136 | 4/1998 | Tsutsui et al. | 369/94 |
| 5,754,507 | 5/1998 | Nishikata | 369/44.29 |

*Primary Examiner*—Thang V. Tran
*Attorney, Agent, or Firm*—Nixon & Vanderhye P.C.

[57] ABSTRACT

An apparatus for reproducing record information of a multiple-layered optical disc is provided with: an optical pickup having a light source for emitting a reading light, an objective lens for condensing the emitted reading light onto one of the information record layers, a focus actuator for moving the objective lens in a focus direction, and a light-detection device for detecting the reflected reading light and outputting a light detection signal; a focus error generation device for generating a focus error signal; an acceleration/deceleration signal generator for generating and outputting to the focus actuator an acceleration signal to accelerate the objective lens in the focus direction and a deceleration signal to decelerate the objective lens in the focus direction; an inter-layer distance measurement device for measuring an interlayer distance between the information record layers of the multiple-layered optical disc; and a controller for measuring a time duration since the acceleration signal is generated until the focus error signal reaches a predetermined threshold level, and for controlling the acceleration/deceleration signal generator to set a magnitude of the deceleration signal on the basis of the measured inter-layer distance and the measured time duration.

10 Claims, 12 Drawing Sheets

FIG. 6

TABLE 1

(INTER-LAYER DISTANCE: 40 μm)     UNIT: μsec

| JUMP POSITION FG No. (#) | FORWARD JUMP | | BACKWARD JUMP | |
|---|---|---|---|---|
| | DECELERATION WAITING TIME | DECELERATION PULSE WIDTH | DECELERATION WAITING TIME | DECELERATION PULSE WIDTH |
| 1 | 688 | 68 | 673 | 130 |
| 5 | 759 | 12 | 629 | 164 |
| 9 | 802 | 0 | 553 | 194 |
| 13 | 762 | 6 | 563 | 176 |
| 17 | 637 | 58 | 649 | 154 |
| 22 | 596 | 96 | 672 | 112 |
| 27 | 574 | 122 | 751 | 90 |
| 30 | 610 | 108 | 733 | 100 |

FIG. 7

TABLE 2

(INTER-LAYER DISTANCE: 60 μm)      UNIT: μsec

| JUMP POSITION FG No. (#) | FORWARD JUMP | | BACKWARD JUMP | |
|---|---|---|---|---|
| | DECELERATION WAITING TIME | DECELERATION PULSE WIDTH | DECELERATION WAITING TIME | DECELERATION PULSE WIDTH |
| 1 | 934 | 90 | 1084 | 108 |
| 5 | 915 | 102 | 1031 | 122 |
| 9 | 996 | 62 | 1051 | 124 |
| 13 | 1071 | 30 | 974 | 148 |
| 17 | 1133 | 12 | 916 | 192 |
| 22 | 1073 | 32 | 991 | 152 |
| 27 | 934 | 68 | 965 | 120 |
| 30 | 882 | 94 | 1101 | 100 |

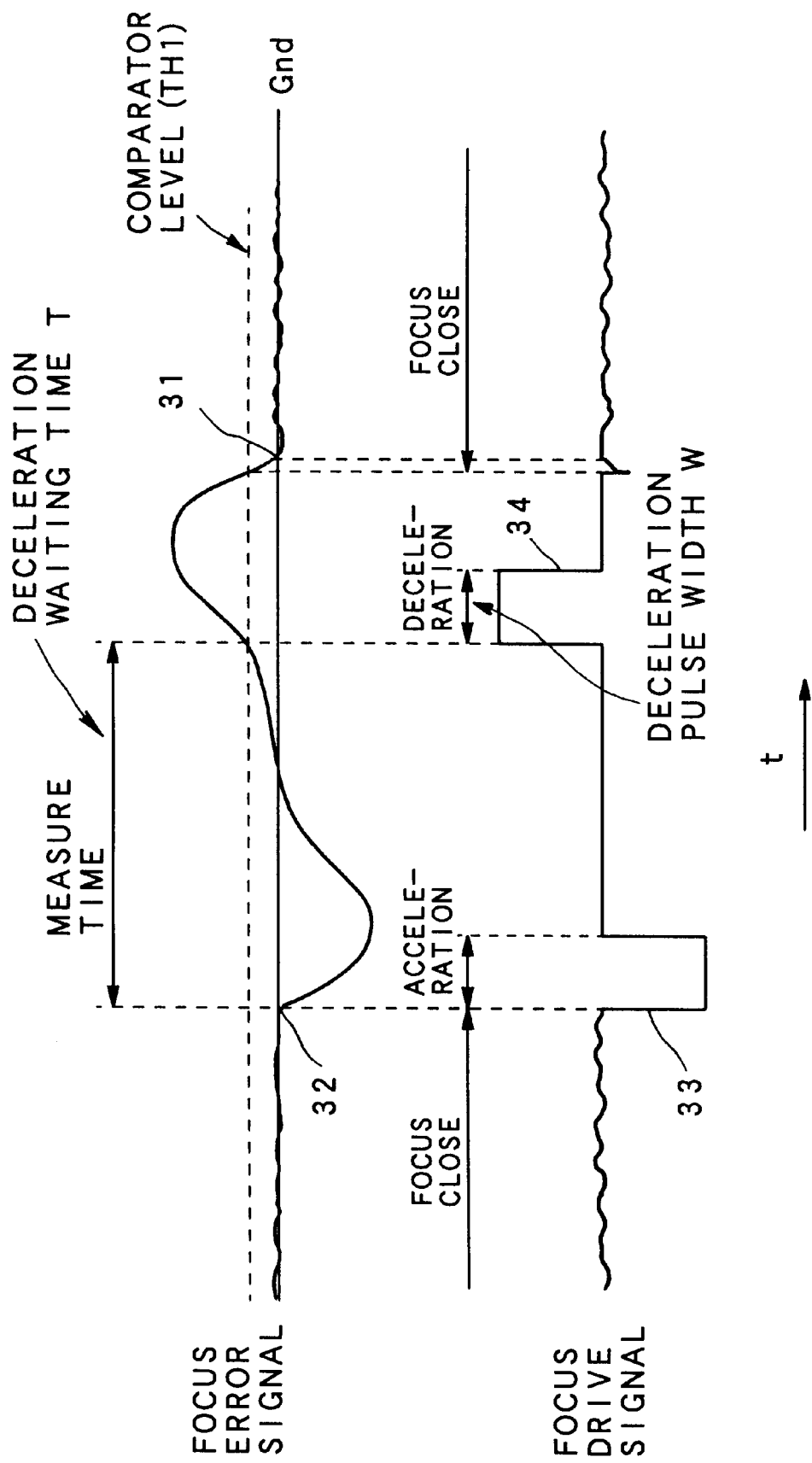

APPARATUS FOR REPRODUCING RECORD INFORMATION OF MULTIPLE-LAYERED OPTICAL DISC

BACKGROUND OF THE INVENTION

1. Field of the Invention

The present invention generally relates to an apparatus for reproducing record information of multiple-layered optical disc, on which the record information is recorded on a plurality of information record layers, and more particularly to a control device in the reproducing apparatus for moving an objective lens in an optical pickup to focus a reading light onto one of the information record layers, which is specified.

2. Description of the Related Art

In a CD (Compact Disc) player for reproducing a CD, as one example of a conventional optical disc, an objective lens is driven by an actuator in an optical pickup to keep a relative distance between the objective lens and the CD constant at a standard value, on the basis of a focus error signal, in order to deal with a so-called surface deflection due to a warp or distortion of the CD.

On the other hand, a so-called DVD is developed as an optical disc of high density recording type. There are various types of recording formats and reading formats for this DVD. As one type of them, there is a multiple-layered optical disc, which has a structure comprising a plurality of information record layers.

When reproducing the multiple-layered optical disc, a control to switch the information record layers to be read becomes necessary, which is not required in the conventional CD player. Namely, a control to move the objective lens in the optical pickup, which is focusing the reading light onto a first information record layer to be presently read, for a distance corresponding to an inter-layer distance between the first information record layer and a second information record layer specified to be nextly read (hereinbelow, it is referred to as an "inter-layer jump"), becomes necessary, so as to focus the reading light onto the second information record layer.

At the time of moving the objective lens in this inter-layer jump, an acceleration signal to accelerate the optical pickup i.e., to generate a driving force in a constant magnitude so as to move the optical pickup is generated, and, after a predetermined time duration, a deceleration signal to decelerate the optical pickup is generated, so that a focus servo is applied to the specified information record layer.

In this case, if the distance between each of the information record layers in the multiple-layered optical disc and the objective lens in the optical pickup is constant (i.e., if the disc is not warped or distorted, and the inter-layer distance within the disc is even), it is possible to apply the focus servo with respect to the specified information record layer in a stable manner at any position on the disc, by generating a constant acceleration signal which is set in advance and by generating, after a constant time duration, a constant deceleration signal.

By the way, the surface deflection is generated in case of the multiple-layered optical disc, since there exists the warp or distortion of the disc, in the same manner as the aforementioned CD. Because of the influence of this surface deflection, the distance between the multiple-layered optical disc and the objective lens is not always constant but is fluctuated or changed in accompaniment with the rotation of the disc.

In order to deal with this surface deflection, the focus servo actuator section for actuating the objective lens is constructed to actuate or drive the objective lens in the direction substantially perpendicular to the surface of the disc, so as to keep the relative distance between the objective lens in the optical pickup and the multiple layered optical disc always constant at a standard value, in a focus close condition.

When the focus servo is changed from this focus close condition to a focus open condition in order to move the objective lens to a position corresponding to the specified information record layer, the driving force which has been applied to follow the surface deflection in the focus close condition is applied to the objective lens as an inertial driving force of the objective lens as it is, in the focus servo actuator section. Thus, the above mentioned inertial driving force due to the surface deflection must be taken into consideration in case that the inter-layer jump is performed so as to focus the reading lightonto the specified information record layer from the information record layer, which is presently being read.

Namely, assuming that the deceleration signal is constant, the following problems may occur. On one hand, if the inertial driving force due to the surface deflection is applied in the direction same as the acceleration direction by the acceleration signal, the deceleration is not enough, so that the focus servo cannot be properly applied with respect to the specified information record layer since the frequency of the focus error signal is too high as compared with the servo band. On the other hand, if the inertial driving force due to the surface deflection is applied in the direction opposite to the acceleration direction by the acceleration signal, the deceleration is in excess, so that the objective lens returns to a position corresponding to the information record layer which has been read. Since such an influence of the surface deflection is different from a position to a position on the disc where the inter-layer jump is performed, the possibility that the inter-layer jump fails is high at the position where the influence of the surface deflection is relatively large.

Further, since the actuated or driven portion including the objective lens in the optical pickup is subjected to an influence of the gravity due to the self weight thereof, it is necessary to control the magnitude (e.g., the pulse height and the pulse width) of the deceleration signal to be an appropriate value and the application timing of the deceleration signal (e.g., the deceleration waiting time) in consideration of the influence of the gravity depending upon the jump direction.

Furthermore, it is practically impossible, by the conventional mass-production of the multiple-layered optical discs, to limit the inter-layer distances in all of the multiple layered optical discs to be within a range where they do not cause the above mentioned problems at the time of performing the inter-layer jump for respective one of the discs.

In other wards, unevenness of the inter layer distances of the information record layers is inevitable between the discs. Thus, according to the DVD specification, in case of the multiple-layered optical disc, the inter-layer distances of the information record layers are prescribed in a range between 40 to 60 $\mu$m (in one disc, the inter-layer distance is designed to be substantially same at any position of the disc).

Thus, since the inter layer distance between the information record layers of the multiple-layered optical disc loaded to the DVD player is not always constant, the inter-layer distance as well as the aforementioned influence of the surface deflection and the jump direction must be taken into consideration at the time of performing the inter-layer jump. Namely, in the example of the above mentioned DVD, there may be a case where the disc having the inter-layer distance of 40 μm is loaded to the DVD player, and a case where the disc having the inter-layer distance of 60 μm is loaded to the DVD player.

Therefore, a problem is raised that the focus servo cannot be appropriately applied to always focus the reading light onto the specified information record layer, unless the surface deflection of the disc and the inter-layer distance between the information record layers are not taken into consideration, at the time of moving the objective lens in the optical pickup in accompaniment with switching the information record layers to be read.

SUMMARY OF THE INVENTION

It is therefore an object of the present invention to provide an apparatus for reproducing record information on a multiple-layered optical disc, which can certainly focus a reading light onto a specified information record layer.

The above object of the present invention can be achieved by an apparatus for reproducing record information of a multiple-layered optical disc having a plurality of information record layers on each of which the record information is recorded. The reproducing apparatus is provided with: an optical pickup having a light source for emitting a reading light, an objective lens for condensing the emitted reading light onto one of the information record layers which is specified by a switch command for switching the information record layers to be read, a focus actuator for moving the objective lens in a focus direction perpendicular to the information record layers, and a light-detection device for detecting the reading light reflected by the specified one of the information record layers and outputting a light detection signal, so as to read the record information of the specified one of the information record layers; a focus error generation device for generating a focus error signal indicating a relative distance between the specified one of the information record layers and the objective lens on the basis of the outputted light detection signal; an acceleration/deceleration signal generator for generating and outputting to the focus actuator an acceleration signal to accelerate the objective lens in the focus direction and a deceleration signal to decelerate the objective lens in the focus direction; an inter-layer distance measurement device for measuring an inter-layer distance between the information record layers of the multiple-layered optical disc; and a controller for measuring a time duration since the acceleration signal is generated by the acceleration/deceleration signal generator until the focus error signal reaches a predetermined threshold level, and for controlling the acceleration/deceleration signal generator in accordance with the switch command to set a magnitude of the deceleration signal on the basis of the measured inter-layer distance and the measured time duration.

According to the reproducing apparatus of the present invention, when the switch command is given so that one of the information record layers to be read is specified, the objective lens is moved by the focus actuator in the focus direction, and the reading light reflected by the specified one of the information record layers is detected by the light detection device. Then, the light detection signal is outputted from the light detection device, and the focus error signal is generated by the focus error generation device on the basis of the outputted light detection signal. At this time of performing the inter-layer jump (i.e., moving the objective lens in the focus direction so as to read another information record layer), the acceleration signal and the deceleration signal are generated and outputted by the acceleration/deceleration signal generator to the focus actuator. In advance of actually reproducing the record information of the multiple-layered optical disc or actually performing the inter-layer jump (e.g., immediately after the multiple-layered optical disc is loaded to the reproducing apparatus), on one hand, the inter-layer distance between the information record layers of the multiple-layered optical disc is measured by the inter-layer distance measurement device. On the other hand, the time duration since the acceleration signal is generated by the acceleration/deceleration signal generator until the focus error signal reaches the predetermined threshold level is also measured by the controller. Then, at the time of performing the inter-layer jump, the acceleration/deceleration signal generator is controlled by the controller to set the magnitude (e.g. the pulse height, the pulse duration) of the deceleration signal on the basis of the measured inter layer distance and the measured time duration.

Accordingly, it is possible to deal with the variation and unevenness of the inter-layer distances from the optical disc to the optical disc as well as the influence of the surface deflection of each optical disc, by moving the objective lens of the optical pickup correspondingly by use of the acceleration and deceleration signals, so that the reading light can be certainly focused onto the desired information record layer to be read, and the record information of the desired information record layer can be certainly read.

In one aspect of the reproducing apparatus of the present invention, the inter-layer distance is a distance between one of the information record layers, the record information of which is being presently read by the optical pickup, and another of the information record layers, which is specified by the switch command to be nextly read.

In another aspect of the reproducing apparatus of the present invention, the magnitude of the deceleration signal is set by the controller on the basis of various relational expressions, which vary as the inter-layer distances vary and each of which employs the measured time duration as a parameter.

In another aspect of the reproducing apparatus of the present invention, the inter-layer distance measurement device measures the inter-layer distance on the basis of the focus error signal.

In another aspect of the reproducing apparatus of the present invention, the controller sets, as the magnitude of the deceleration signal, at least one of a height of the deceleration signal and an output time duration of the deceleration signal.

In another aspect of the reproducing apparatus of the present invention, the acceleration/deceleration signal generator generates a first pulse as the acceleration signal and a second pulse which polarity is opposite to that of the first pulse as the deceleration signal.

In another aspect of the reproducing apparatus of the present invention, the focus actuator includes a focus coil for moving the objective lens in the focus direction.

In another aspect of the reproducing apparatus of the present invention, the reproducing apparatus is further provided with a switch device for switching to one position to open a focus servo loop for the optical pickup and supply the acceleration and deceleration signals therethrough to the focus actuator, and switching to another position to close the focus servo loop.

In another aspect of the reproducing apparatus of the present invention, the reproducing apparatus is further provided with a chopping wave generator for generating, to the focus actuator, a chopping wave to move the objective lens.

In another aspect of the reproducing apparatus of the present invention, the controller has a memory device for storing optimum deceleration signals with respect to various deceleration waiting time, which is a time duration since the acceleration signal is applied to the focus actuator until the deceleration signal is applied to the focus actuator, for each jump direction and each inter-layer distance in advance of reproducing the multiple-layered optical disc.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a table of the deceleration waiting time and the deceleration pulse width for forward and backward jumps at each jump position in case that the inter-layer distance is 40 $\mu$m;

FIG. 7 is a table of the deceleration waiting time and the deceleration pulse width for forward and backward jumps at each jump position in case that the inter layer distance is 60 $\mu$m;

FIG. 13 is a waveform chart of a focus drive signal and a focus error signal FE at the time of a forward jump.

DETAILED DESCRIPTION OF THE PREFERRED EMBODIMENTS

Referring to the accompanying drawings, an embodiment of the present invention will be now explained.

Figure 1:
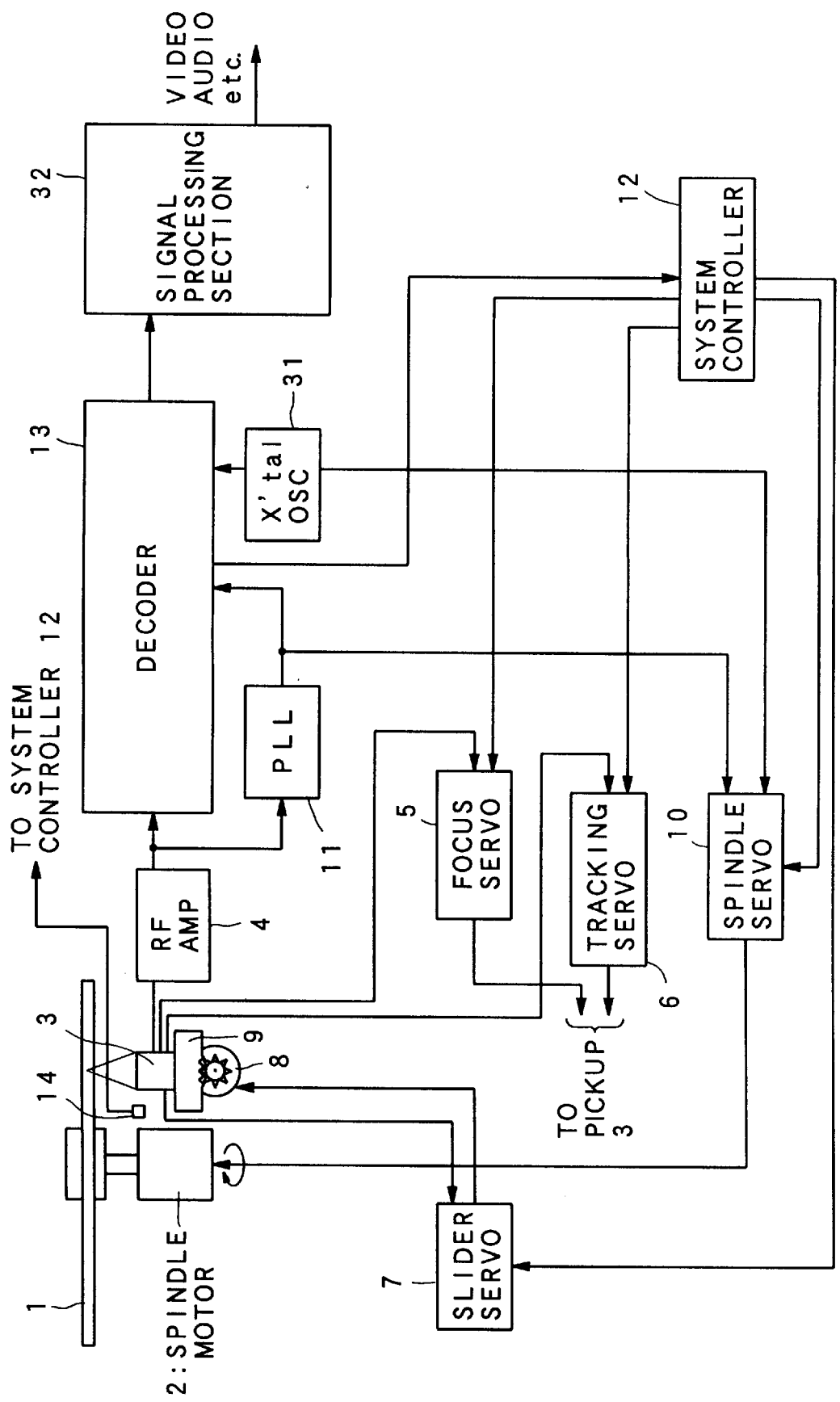
FIG. 1 is a schematic block diagram of an apparatus for reproducing record information of a multiple-layered optical disc as an embodiment of the present invention.

FIG. 1 is a schematic block diagram of an apparatus for reproducing record information on an multiple- layered optical disc as an embodiment of the present invention.

In FIG. 1, a reproducing apparatus, to which an optical disc 1 is loaded, is provided with a spindle motor 2, an optical pickup 3, an RF (Radio Frequency) amplifier (AMP) 4, a focus servo circuit 5, a tracking servo circuit 6, a slider servo circuit 7, a slider motor 8, a slider 9, a spindle servo circuit 10, a PLL (Phase Lock Loop) circuit 11, a system controller 12, a decoder 13, a position detection switch 14, a X'tal (crystal) oscillator (OSC) 31 and a signal processing section 32.

An optical disc 1 is a multiple-layered optical disc, which comprises a plurality of information record layers on each of which the record information is recorded so as to improve the recording density. In the present embodiment, the optical disc 1 has a double-layered structure i.e., two layers on one side thereof. The optical disc 1 is loaded on a turn table of the spindle motor 2 such that the side provided with these information record layers is directed downward.

The record information on the optical disc 1, which is rotation-driven by the spindle motor 2, is read by the optical pickup 3. The optical pickup 3 includes a laser diode, an objective lens, a focus actuator, a tracking actuator, a photo-detector and so on.

An output (i.e. an RF signal) of the optical pickup 3 is supplied to the RF amplifier 4, as well as the focus servo circuit 5 and the tracking servo circuit 6. The focus servo circuit 5 and the tracking servo circuit 6 control and drive a focus actuator and a tracking actuator in the optical pickup 3 respectively, in accordance with a command from the system controller 12. Thus, the laser light generated from the laser diode in the optical pickup 3 is appropriately focused onto respective one of the information record layers of the optical disc 1 so as to form a light spot for detecting the record information. And that, in case of reading the record information on the optical disc 1, the position of the light spot in the radial direction of the optical disc 1 is controlled so that the light spot is positioned on a track formed on the information record surface of one of the information record layers of the optical disc 1.

A coil current, which is supplied to a coil to drive the tracking actuator in the optical pickup 3, is supplied to the slider servo circuit 7. A current detection signal corresponding to the supplied coil current is generated by the slider servo circuit 7, and, after it is subjected to signal processes such as a signal amplification, a phase compensation and the like, it is outputted as a drive signal for the slider motor 8. Therefore, the slider 9, on which the optical pickup 3 is mounted and which is movable in the disc radial direction, is driven and moved by the slider motor 8, so that the tracking actuator in the optical pickup 3 is positioned at an intermediate position of its movable range.

On the other hand, the RF signal outputted from the RF amplifier 4 is supplied to the decoder 13 and the PLL circuit 11. The PLL circuit 11 generates a clock signal, which is in phase of the clock component included in the supplied RF signal, and supplies it to the spindle servo circuit 10 and the decoder 13.

The decoder 13 is a circuit block to decode the RF signal, to which a coding process suitable for recording such as an EFM (Eight to Fourteen Modulation) or the like has been applied for example, to the original digital signal. The decoder 13 supplies absolute time information, music title information, data appendix information for the video information, the computer program or the like etc., from among the decoded digital signals, to the system controller 12. The decoder 13 also supplies to the digital data including the audio information, the video information, the computer program and the like to the signal processing section 32.

The signal processing section 32 obtains the digitized record information data on the basis of the supplied digital data, and may transfer it to the external of the reproducing apparatus at a predetermined timing, or may D/A-convert and output it to the external as the video or audio signal.

The spindle servo circuit 10 rotation-controls the spindle motor 2 so that the optical disc 1 may have a desired rotation speed, on the basis of the clock signal in phase of the reproduction signal supplied from the PLL circuit 11 and a standard clock signal supplied from the X'tal oscillator 31.

The position detection switch 14 is disposed on a moving line in a radial direction of the optical pickup 2, and is constructed to close and output a detection signal when the irradiation position of the light beam on the optical disc 1 enters the lead in area along with the movement of the optical pickup 2.

The detection signal of the position detection switch is supplied to the system controller 12.

The system controller 12 consists of a micro computer having a processor, a ROM, a RAM and the like. The data appendix information from the decoder 13, the reproduction command signal from operation keys (not illustrated in the figure), the reproduction command signal for each information record layer of the optical disc 1, the detection signal from the position detection switch 14 and the like are inputted to the system controller 12.

In the system controller 12, the processor signal-processes the inputted signals according to the program stored in advance in the ROM, and controls each of the focus servo circuit 5, a tracking servo circuit 6, a slider servo circuit 7, a spindle servo circuit 10 and so on.

The reproducing apparatus in the embodiment is constructed as described above.

Figure 2:
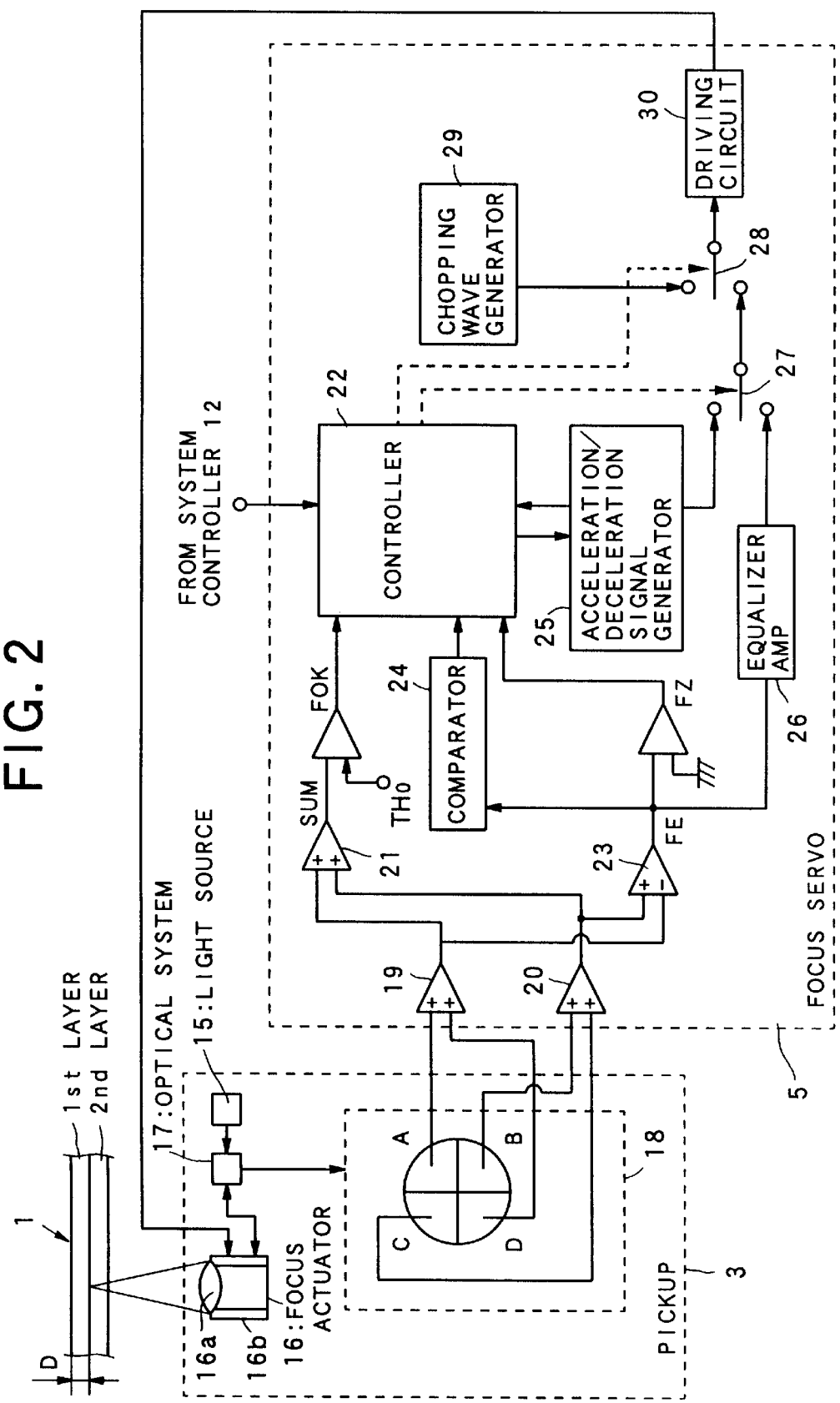
FIG. 2 is a block diagram of an optical pickup and a focus servo circuit of the reproducing apparatus of FIG. 1.

FIG. 2 shows a detailed structure of portions of the reproducing apparatus of FIG. 1, which are related to the focus servo control.

In FIG. 2, the optical pickup 3 is provided with: a light source 15 having a laser diode or the like for example; a focus actuator section 16, in which an objective lens 16a and a focus coil 16b are integrally formed and which is elastically supported by a supporting member with respect to a main body of the optical pickup 2; an optical system 17 for directing and guiding the light emitted from the light source 15 and the light reflected from the optical disc 1; and a photo-detector element 18 for detecting the light reflected from the optical disc 1 through the optical system 17. Thus, the optical pickup 3 is constructed to input the light emitted from the light source 15 to the objective lens 16a of the focus actuator section 16 by the optical system 17, and to condense the inputted light onto respective one of the information record layers of the optical disc 1 so as to form the light spot with an astigmatism. The optical pickup 3 is also constructed to guide the reflected light obtained by the light spot again to the objective lens 16a of the focus actuator section 16 and further to the photo-detector element 18 through the optical system 17.

The photo-detector element 18 has, as shown in FIG. 2, four-divided photo-detectors A to D, and the outputs of the respective pairs of these photo-detectors at diagonal positions are added respectively by adders 19 and 20 in the focus servo circuit 5, and the added result outputs are further added by the adder 21, so as to generate the focus sum signal SUM.

The generated focus sum signal SUM is compared with a standard value THO as a predetermined threshold level, and a FOK (Focus OK) signal is supplied to the controller 22 when the focus sum signal SUM is higher than the standard value THO.

The outputs of the adders 19 and 20 are supplied to the subtracter 23, so as to generate a differential output signal i.e., a focus error signal FE.

Figure 3:
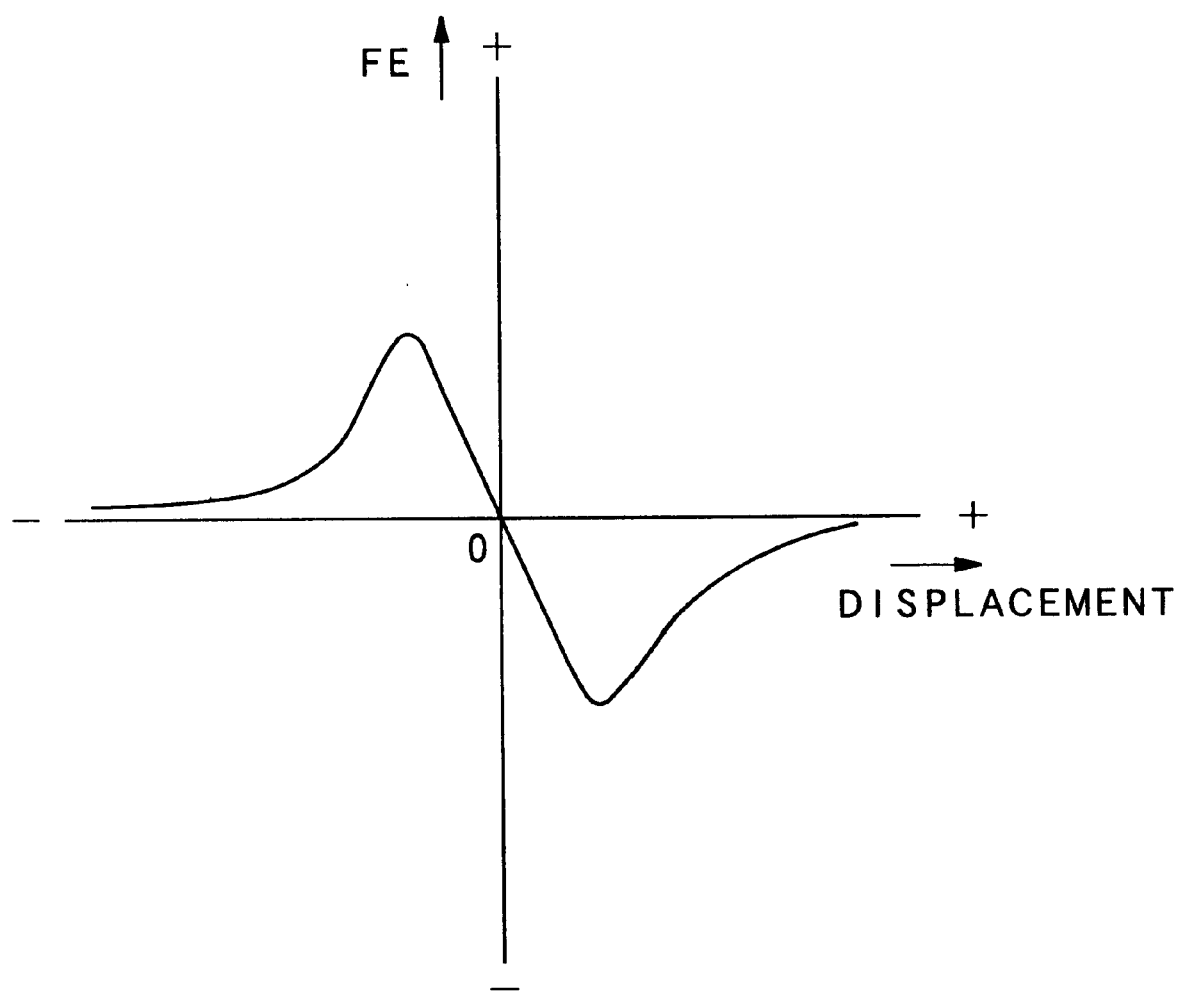
FIG. 3 is a graph showing a S-letter characteristic of a focus error (FE) signal of the information record layer.

As shown in FIG. 3, the focus error signal FE becomes a "0" output level in case that the relative distance between the objective lens 16a of the optical pickup 3 and respective one of the information record layers is equal to the standard distance corresponding to respective one of the information record layers, and has a S-letter characteristic in which the output level thereof is continuously changed in accordance with the displacement from the standard distance before and after respective one of the information record layer.

The focus error signal FE generated by the subtracter 23 is compared with a standard level (i.e. a 0 or ground level), and the comparison result output is supplied to the controller 22 as a FZ signal.

On the other hand, the focus error signal FE is compared with the predetermined threshold levels TH1 and TH2 by the comparator 24, and a comparison result output is supplied to the controller 22.

The controller 22 controls an acceleration/deceleration signal generator 25 on the basis of a command signal from the system controller 12, the comparison result output from the comparator 24, the FOK signal, the FZ signal and the like, so that the acceleration/deceleration signal generator 25 appropriately generates a acceleration signal or a deceleration signal for use in the case that the inter-layer jump is performed. The inter-layer jump is such a control to move the objective lens so as to focus the reading light onto another information record layer while the optical pickup 3 is reading the record information on one information record layer of the optical disc 1.

The focus error signal FE is supplied to one input terminal of a switch 27 through an equalizer amplifier 26, and the output of the aforementioned acceleration/deceleration signal generator 25 is supplied to another input terminal of the switch 27. The output terminal of the switch 27 is connected to one input terminal of an switch 28. The output of a chopping wave generator 29 for generating a chopping wave (i.e. a wave having a chopping or triangle shape) is supplied to another input terminal of the switch 28.

On the other hand, the output terminal of the switch 28 is connected to a driving circuit 30. By switching the switches 27 and 28 by the controller 22, either one of: the output of the equalizer amplifier 26; the output of the acceleration/deceleration signal generator 25; and the output of the chopping wave generator 29, is supplied to the driving circuit 30. The driving circuit 30 drives the objective lens 16a in the focus direction of the optical disc 1 by driving the focus coil 16b in the focus actuator section 16 on the basis of the supplied signal.

The control operation for switching the switches 27 and 28 by the controller 22 is performed appropriately when the reproducing apparatus starts reading out the record information from the optical disc 1 and performs the inter-layer jump. In case that the reproducing apparatus starts reading out the record information from the optical disc 1, the controller 22 operates the switch 28 to supply the output of the chopping wave generator 29 to the driving circuit 30, so that the objective lens 16a is driven in the focus direction of the optical disc 1. Then, in case that the FOK signal is obtained, by detecting the FZ signal obtained from the information record layer to be read out and by operating the switches 27 and 28 at a predetermined timing, the output of the equalizer amplifier 26 is supplied to the driving circuit 30 through the switches 27 and 28, so that the focus servo loop is formed to turn ON the focus servo. At the same time, by operating the tracking servo circuit 6 and the spindle servo circuit 10 by the system controller 12, each of the tracking servo and the spindle servo is also turned ON, so as to start reading out the signal from the record area to be read out.

On the other hand, while reading out the record information of one information record layer, in case of performing the inter-layer jump to read out the record information of another information record layer, the controller 22 controls the switch 27 to switch at a predetermined timing described later to supply the output of the acceleration/deceleration signal generator 25 to the driving circuit 30. Then, as mentioned before, after the objective lens 16a in the optical pickup 3 is driven by the predetermined acceleration signal at the time of performing the inter-layer jump, the controller 22 controls to drive the objective lens 16a by the deceleration signal having a timing and a magnitude corresponding to (i) the inter-layer distance within the optical disc 1 and (ii) the magnitude of the surface deflection of the optical disc 1 at the time of performing the inter-layer jump.

In this case, the controller 22 controls to output the appropriate deceleration signal for the inter-layer jump and drive the objective lens 16a, by storing in advance (i) the optimum deceleration signal corresponding to the inter-layer distance of the optical disc 1 and the surface deflection of the optical disc 1 and (ii) the data corresponding to the driving timing.

Hereinbelow, the way to obtain the appropriate deceleration signal corresponding to the inter-layer distance and the surface deflection at the time of the inter-layer jump in case of the double layered optical disc, and the principle thereof are explained.

1. Relation of Surface Deflection and Deceleration Waiting Time

With respect to the driving force applied to the objective lens at the time of the inter-layer jump, the driving force following the surface deflection in the focus close condition is added in addition to the driving force due to the acceleration signal as described before. Thus, the jump time until the information record layer as the jump target is influenced by the surface deflection even in case that a constant acceleration signal is applied.

For this reason, the time from starting the inter-layer jump until the focus error signal FE exceeds a predetermined threshold value (TH1 or TH2) is experimentally measured under a condition where the constant acceleration signal is applied. As a result, it is turned out that the deceleration waiting time corresponds to the surface deflection of the optical disc 1 at each jump position of the optical disc 1 as explained below. The threshold values TH1 and TH2 have reverse polarities to each other, and have the same absolute value from the standard level (0 level) to each other. The threshold value TH1 is used for a forward jump (i.e. an inter-layer jump from the first layer to the second layer of the optical disc 1). The threshold value TH2 is used for a backward jump (i.e. an inter-layer jump from the second layer to the first layer of the optical disc 1).

Figure 4:
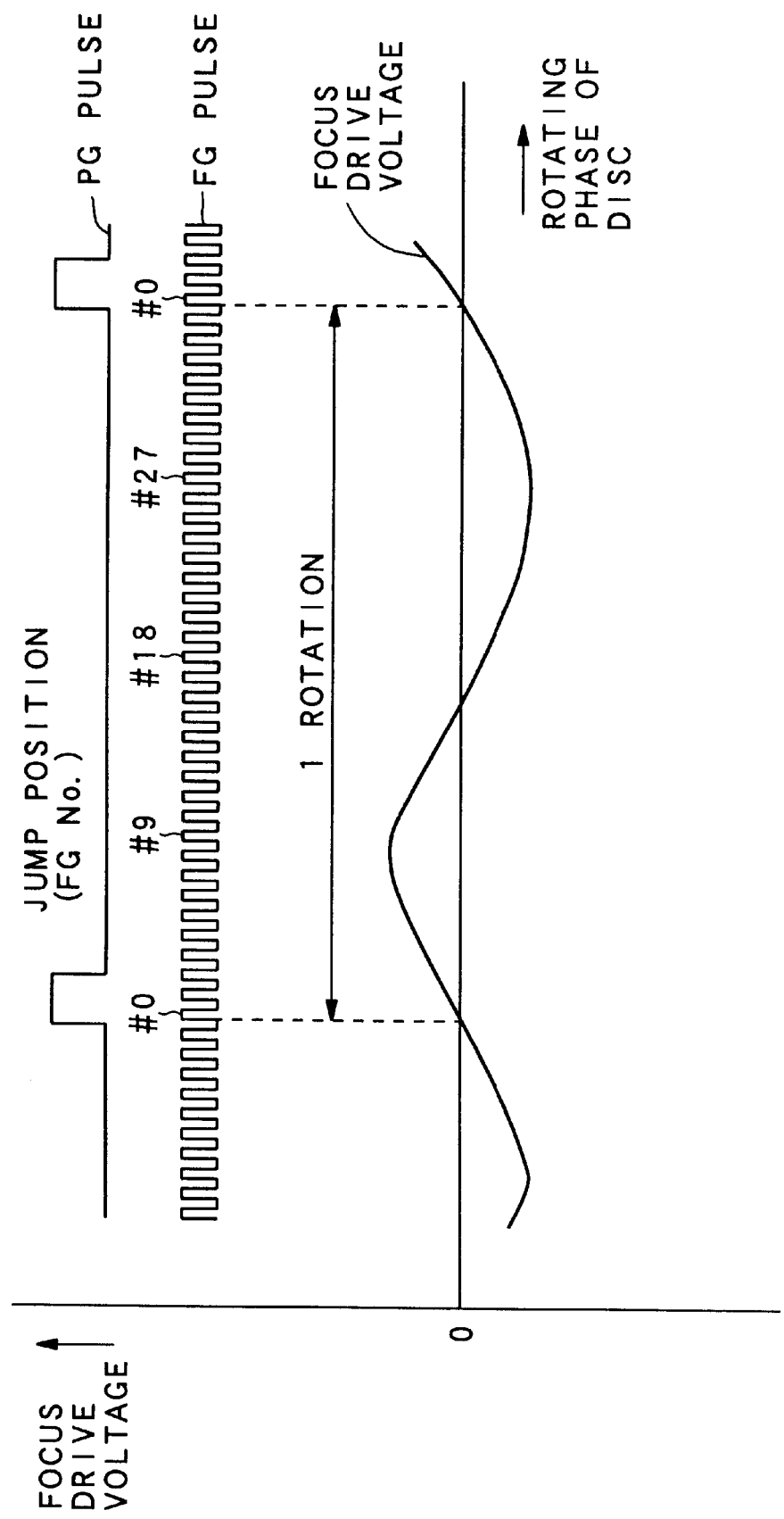
FIG. 4 is a diagram showing a relationship between a jump position and a focus drive voltage in case of using the disc in which the surface deflection occurs.

FIG. 4 is a diagram showing a result of measuring a focus drive voltage in the focus close condition in case of using the double layered optical disc (which inter-layer distance is 40 $\mu$m) as the optical disc 1 in which the surface deflection occurs. In FIG. 4, at the position #0 and #18, the influence of the surface deflection is relatively small. At the position #9, a relatively large surface deflection in such a direction that the optical disc goes away from the optical pickup acts. At the position #27, a relatively large surface deflection in such a direction that the optical disc approaches the optical pickup acts. Namely, the focus drive voltage shown in FIG. 4 indicates the magnitude of the surface deflection.

Since the influence of the surface deflection substantially corresponds to the rotation phase of the optical disc, the inter-layer jump is performed by means of a circuit to start the focus jump at a predetermined timing by use of the acceleration signal having the constant magnitude, on the track at a constant disc radial position, and the deceleration waiting time at each jump position is measured. As a result of the measurement, the graph shown in FIG. 5 is obtained.

The above explained timing of starting the inter-layer jump is regulated by the PG pulses, which are generated once every rotation, and the FG pulses which are generated 36 times every rotation. At each position which are obtained by dividing one turn of the track at a predetermined radius of the optical disc by 36 equal circular arcs, the deceleration waiting time is detected one after another as the time duration since the acceleration signal is applied at the time of the inter-layer jump by the acceleration signal having the constant magnitude until the focus error signal FE reaches the threshold value TH2. Namely, it is understood that the focus drive voltage indicates the degree of the warp or distortion of the optical disc i.e. the surface deflection of the optical disc.

Figure 5:
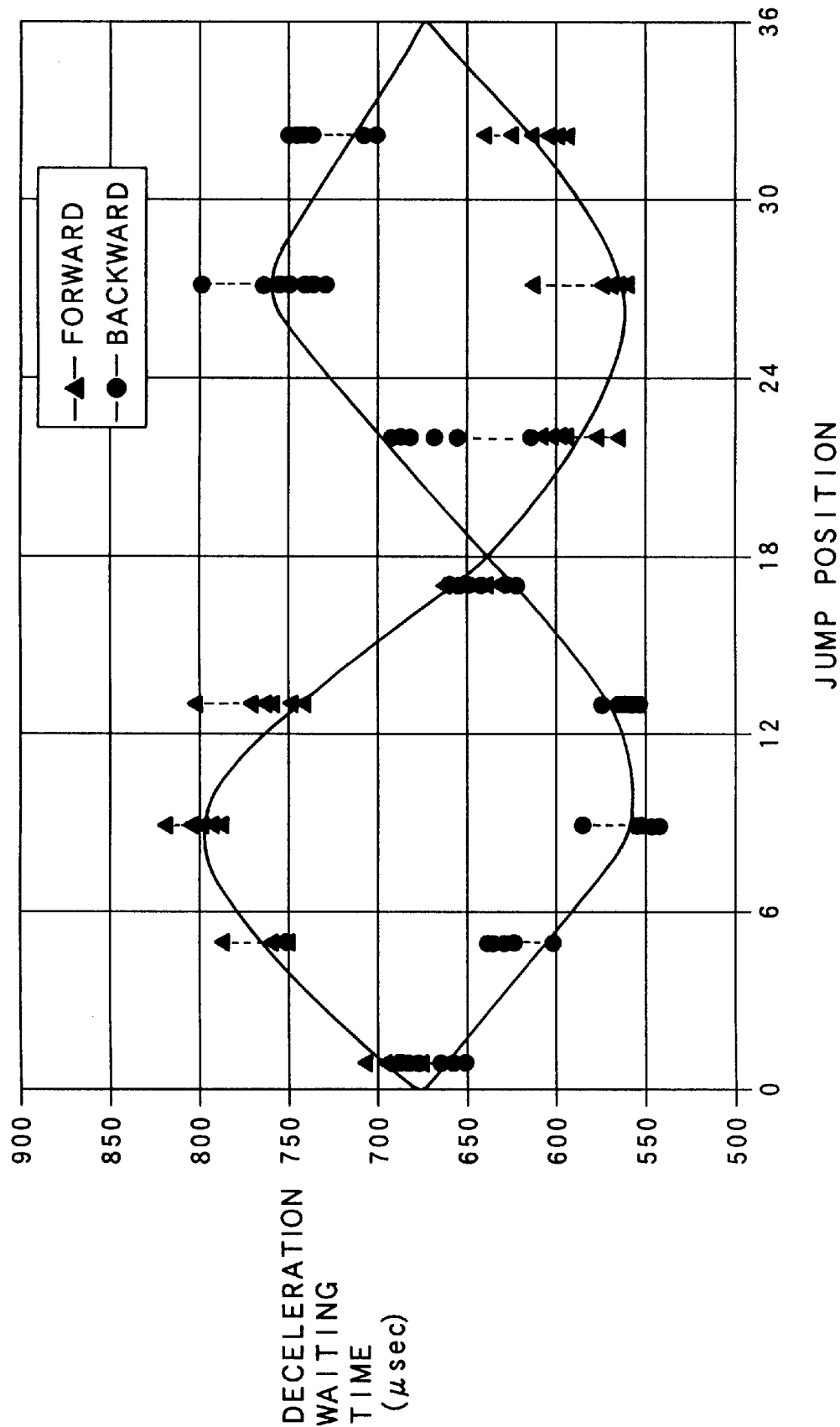
FIG. 5 is a graph showing measurement results of deceleration waiting time at each jump position of the disc in case of performing the inter-layer jump by a predetermined acceleration signal.

In FIG. 5, by use of the PG pulses and the FG pulses, the deceleration waiting time at each jump position is plotted to form curves on the graph on the basis of the average value of a plurality of measurement results as for each of the forward jump and the backward jump.

In case of the optical disc in which the influence of the surface deflection is nil, the deceleration waiting time is always constant regardless of the jump position, in the forward jump or the backward jump. However, as shown in FIG. 5, in case of the optical disc in which the surface deflection occurs, the deceleration waiting time is different from the jump position to the jump position. Namely, if the surface deflection is directed in the direction same as the acceleration direction of the acceleration signal at the time of the inter-layer jump, the focus driven portion including the objective lens is driven by the larger acceleration force by the amount due to the surface deflection. Alternatively, if the surface deflection is directed in the direction opposite to the acceleration direction of the acceleration signal at the time of the inter-layer jump, the focus driven portion including the objective lens is braked against the acceleration force by the acceleration signal (i.e., driven by the smaller acceleration force) by the amount due to the surface deflection.

Here, taking the forward jump shown in FIG. 5 as an example, since the surface deflection acts in the direction same as the acceleration direction at the position #9, the time until the focus error signal gets smaller than the threshold value TH2 becomes longer. Since the surface deflection acts in the direction opposite to the acceleration direction at the position #27, the time until the focus error signal gets smaller than the threshold value TH2 becomes shorter.

On the other hand, taking the backward jump shown in FIG. 5 as an example, since the surface deflection acts in the direction opposite to the acceleration direction at the position #9, the time until the focus error signal gets smaller than the threshold value TH1 becomes shorter. Since the surface deflection acts in the direction same as the acceleration direction at the position #27, the time until the focus error signal gets smaller than the threshold value TH1 becomes longer.

The curve shape in the graph of the focus drive voltage (i.e. the magnitude of the surface deflection) in FIG. 4 and the curve shape in the graph of the relationship between the jump position and the deceleration waiting time in FIG. 5 resemble each other. Thus, it is turned out that the influence of the surface deflection reflects the deceleration waiting time i.e., the deceleration waiting time at the time of the inter-layer jump corresponds to the magnitude of the surface deflection of the optical disc at the jump position.

2. Relation of Deceleration Waiting Time and Deceleration Signal

Next, FIG. 6 shows a table 1 indicating a result of an experiment in consideration of the result of the experiment of FIG. 4. In this experiment, the optimum deceleration pulse width is obtained in association with the deceleration waiting time at each jump position, by adjusting the pulse width of the pulse signal one after another, which is applied at each jump position of the optical disc as aforementioned after the deceleration waiting time has elapsed and which is outputted as the deceleration signal, so as to appropriately perform the inter-layer jump. In this case, the double-layered optical disc having the inter-layer distance between the information record layers of 40 μm is utilized.

FIG. 7 shows a table 2 indicating a result of another experiment. In this experiment, the double-layered optical disc having the inter-layer distance of 60 μm is utilized, and the relationship between the deceleration waiting time at each jump position and the optimum pulse width of the deceleration signal is obtained in the same manner as the experiment corresponding to the table 1 of FIG. 6.

Figure 8:
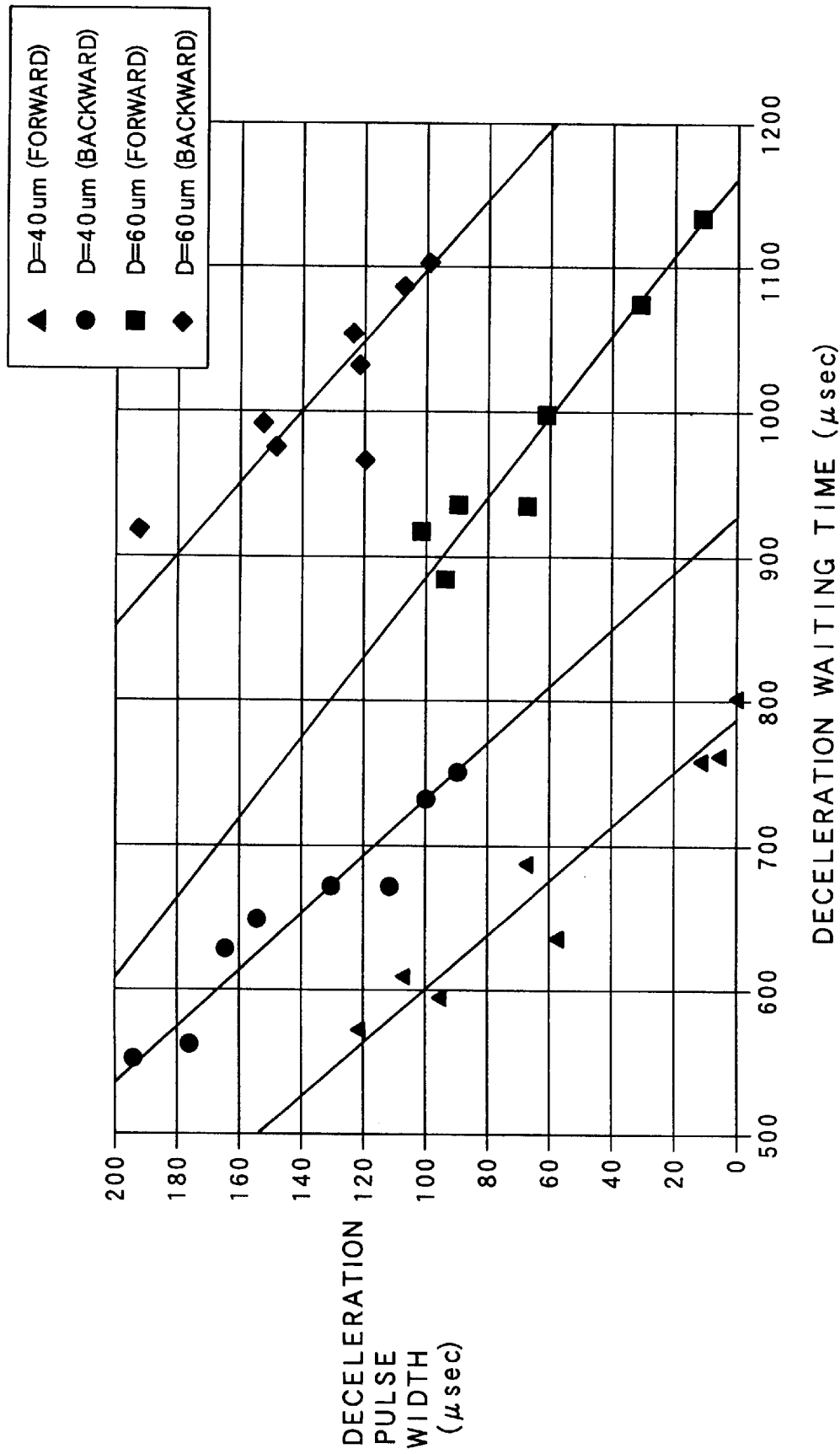
FIG. 8 is a graph showing a relationship between the deceleration waiting time and the optimum deceleration pulse.

FIG. 8 is a graph in which the results shown in the tables 1 and 2 of FIGS. 6 and 7 are plotted for the deceleration waiting time as the X axis and the optimum deceleration pulse width as the Y axis. From FIG. 8, it is understood that the relationship between the deceleration pulse width and the deceleration waiting time can be approximated by a relational expression which is different depending upon the inter-layer distance between the information record layers and the direction of the inter-layer jump (i.e. the relationship can be approximated by a straight line in a range of the experiment i.e., the deceleration pulse width can be approximated by a linear function of the deceleration waiting time as the parameter).

Therefore, on the basis of the relational expression obtained in the above explained manner, the values of the optimum deceleration pulse widths with respect to the deceleration waiting time for each jump direction and each inter-layer distance are stored in advance in a memory such as the ROM etc. of the reproducing apparatus. Then, as long as the jump direction and the inter-layer distance are known at the time of performing the inter-layer jump, it is possible to easily obtain the optimum deceleration signal (i.e. the optimum deceleration pulse width) in consideration of the surface deflection, the inter-layer distance and the influence of the gravity due to the difference in the jump direction, by measuring the deceleration waiting time at the time of the inter-layer jump.

Alternatively, the relational expressions themselves which are obtained in the above explained manner for each jump direction and each inter-layer distance may be stored in advance into a memory such as the ROM etc. of the reproducing apparatus. Then, the optimum relational expression for the jump direction and the inter-layer distance at the time of the inter-layer jump may be read out from the ROM etc., so that the deceleration pulse width may be obtained from the read out relational expression together with the measured deceleration waiting time at the time of the inter-layer jump.

The case where the above described method of obtaining the deceleration signal is applied to the reproducing apparatus of the present embodiment is described next.

The controller 22 stores the values of the optimum deceleration pulse widths with respect to the deceleration waiting time, which are obtained by the aforementioned experiment (the aforementioned measurement) on the basis of the relational expression between the deceleration waiting time and the pulse width with the inter-layer distance of the optical disc as its parameter, into the ROM etc. in advance. Then, the controller 22 measures the inter-layer distance of the loaded optical disc in advance of actually reproducing the loaded optical disc, and selects the data as for the deceleration waiting time and the deceleration pulse width which are corresponding to the inter layer distance closest to the inter-layer distance of the loaded optical disc. Then, in case of actually performing the inter-layer jump from one information record layer to another information record layer, the data as for the deceleration waiting time corresponding to the jump direction as well as the optimum deceleration pulse width thereof are selected, so that the controller 22 controls the output of the acceleration/deceleration generator 25 on the basis of the data as for the optimum deceleration pulse width in accordance with the deceleration waiting time at the time of the inter-layer jump.

Alternatively, only the relational expressions may be stored in advance in the ROM etc. of the controller 22, one relational expression may be selected from among these stored relational expressions, and the pulse width may be calculated from this selected relational expression and the deceleration waiting time at the time of the inter-layer jump.

When the switches 27 and 28 are controlled to be switched by the controller 22 at the time of the inter-layer jump and the focus servo becomes into its open condition, the force is applied so as to move the objective lens in such a manner to cancel the surface deflection at the focus driven portion. More concretely, in case that the surface deflection is in the direction same as the acceleration direction of the acceleration signal at the time of the inter-layer jump, the focus actuator section 16 including the objective lens 16a is actuated or driven by the acceleration force, which is larger than the acceleration force by the acceleration signal by the amount due to the surface deflection. In case that the surface deflection is in the direction opposite to the acceleration direction of the acceleration signal at the time of the inter-layer jump, the focus actuator section 16 including the objective lens 16a is braked against the acceleration force by the acceleration signal (i.e., driven by the smaller acceleration force) by the amount due to the surface deflection. However, in either case, since the length of the deceleration waiting time is changed depending upon the direction of the surface deflection at the time of the inter layer jump, the controller 22 can determined the optimum deceleration pulse width in consideration of the surface deflection on the basis of the length of the deceleration waiting time.

In this manner, the controller 22 controls to focus the reading light onto the desired information record layer by moving the objective lens of the optical pickup to perform the inter-layer jump, in correspondence with the variation or unevenness of the inter-layer distance between the information record layers for each optical disc as well as the influence of the surface deflection of each optical disc at the time of switching the information record layers to be read.

3. Detection of Inter-layer Distance

Next, the detecting operation of the reproducing apparatus of FIG. 1 for detecting the inter-layer distance between the information record layers of the loaded optical disc is explained.

Figure 9:
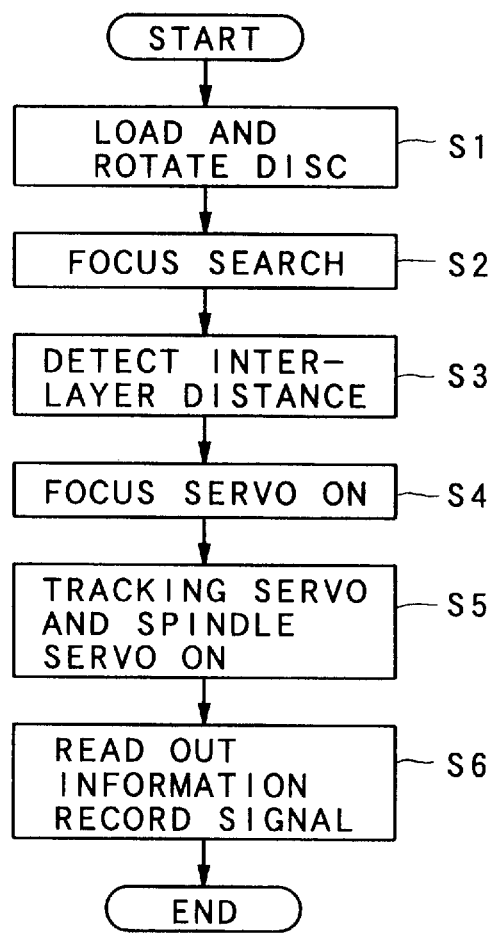
FIG. 9 is a flow chart showing processes since the optical disc is loaded to the reproducing apparatus of the embodiment until the reading out operation for the record information of the specified information record layer is started.

FIG. 9 is a flow chart showing processes since the optical disc 1 is loaded to the reproducing apparatus of FIG. 1 until the reading out operation for the record information of the specified information record layer is started.

In FIG. 9, at first, when the optical disc 1 is loaded to the reproducing apparatus and the reproduction command for a certain record area of the loaded optical disc 1 is given to the reproducing apparatus, the loaded optical disc 1 is rotated under the control of the system controller 12, and the focus search control command is outputted by the system controller 12 to the controller 22 (Step S1).

Then, according to the focus search control command, the controller 22 controls the driving circuit 30 to supply the output of the chopping wave generator 29 by operating the switch 28 (Step S2). At this time, the driving circuit 30 outputs the output signal corresponding to the inputted chopping wave to the focus coil 16b of the focus actuator section 16 in the optical pickup 3, so as to perform the focus search operation by moving the objective lens 16b integrally formed with the focus coil 16b forward and backward along the direction perpendicular to the information record layer.

Figure 10:
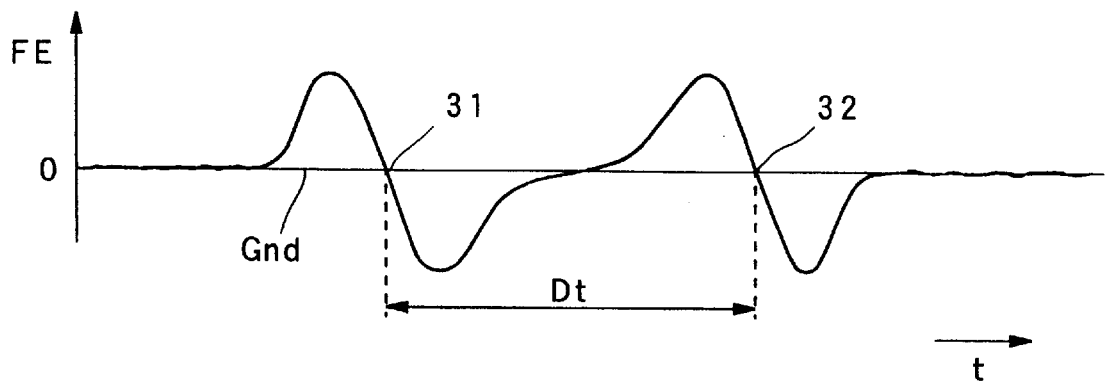
FIG. 10 is a graph showing a S letter characteristic of a focus error signal in case of a double layered optical disc.

By this, the relative distance between the objective lens 16a and the optical disc 1 is changed, and, as shown in FIG. 10, the focus error signal FE having a two S-letter characteristic in correspondence with the two information record layers is repeatedly outputted in accordance with the output of the chopping wave from the output terminal of the subtracter 23. In FIG. 10, focus zero cross points 31 and 32 are illustrated which indicate the focus points of the first and second information record layers of the optical disc 1 respectively, and which are detected by the FZ signal supplied to the controller 22.

Incidentally, at the Step S2, at the vicinity of the focus point of each information record layer, the FOK signal based on the focus sum signal SUM generated by the adder 21 is supplied to the controller 22. By this, the controller 22 detects the total number and the arrangement of the information record layers of the loaded optical disc 1, and stores them into a memory such as the RAM etc. of the controller 22.

Next, the controller 22 calculates the detection time for the two focus zero cross points shown in FIG. 10 by the detection timing of the above mentioned FZ signal, and further calculates the inter-layer distance D between two information record layers of the loaded optical disc 1 on the basis of the elapse time Dt from the detection of the zero cross point for the first layer to the detection of the zero cross point for the second layer. This calculated inter-layer distance D is stored into a memory such as the RAM etc. of the controller 22 together with the arrangement of the corresponding information record layers as the disc data of the loaded optical disc 1 (step S3).

Then, the controller 22 turns ON the focus servo on the target information record layer on the basis of the detection of the FOK signal of the target information record layer to be read (Step S4). Successively, the system controller 12 controls the tracking servo circuit 6, the spindle servo circuit 10, a slider servo circuit 7 and so on, so as to turn ON each servo circuit in the reproducing apparatus (step S5). Finally, the information record signal in the target area on the target information record layer is read out (Step S6), and one series of the processes including the detection of the inter-layer distance are ended.

4. Control for Inter-layer Jump

Next, the inter-layer jump in which, while the reproducing apparatus of FIG. 1 is reading the record information of one information record layer of the optical disc 1, jumps the reading position to another information record layer so as to read the record information of another information record layer, is explained.

Figure 11:
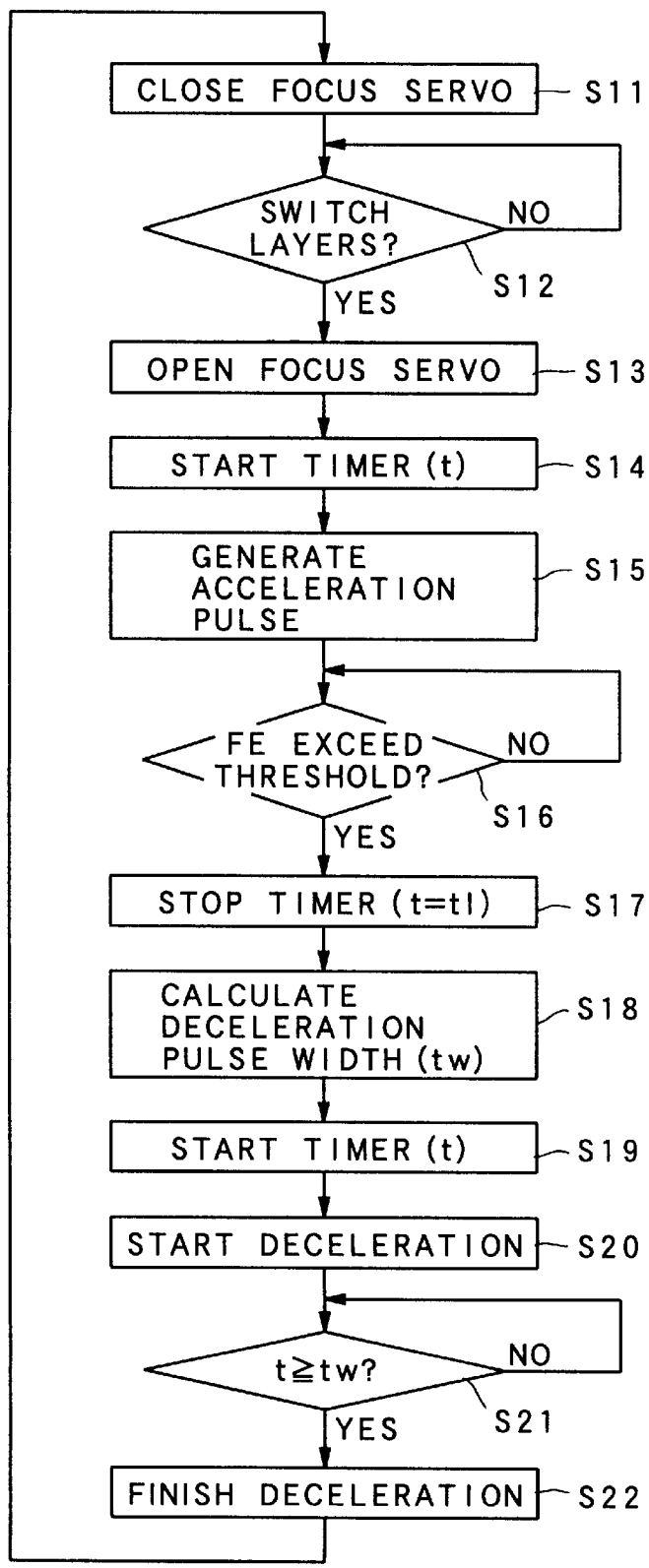
FIG. 11 is a flow chart of an operation for the inter-layer jump.

FIG. 11 is a flow chart of the inter-layer jump for the double-layered optical disc 1 performed by the reproducing apparatus of the present embodiment.

In FIG. 11, at first, the reproducing apparatus for the double-layered optical disc 1 closes the focus servo and reads the record information of one information record layer of the optical disc 1 (Step S11). In this focus close condition, the controller 22 judges whether or not the switch command for switching the information record layers to be read is given (Step S12).

Figure 12:
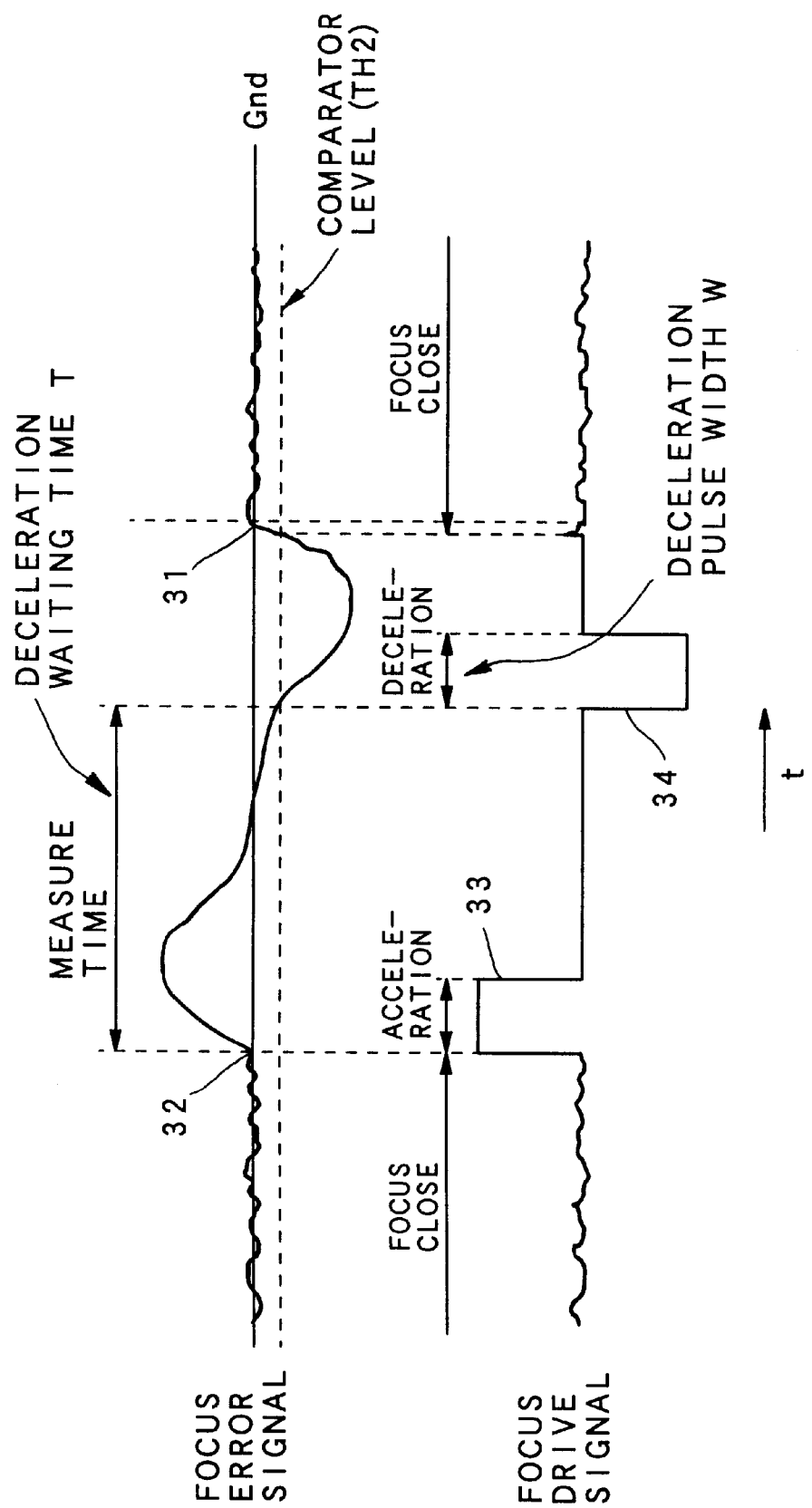
FIG. 12 is a waveform chart of a focus drive signal and a focus error signal FE at the time of a backward jump.

Here, if the switch command is given from the system controller 12 (Step S12: YES), the operation flow branches to a Step S13, where the focus servo of the optical pickup 3 which is reading the record information is opened (Step S13). Then, the timer of the system controller 12 is started (Step S14), and an acceleration pulse 33 as shown in FIG. 12 is generated in interlock with the timer (Step S15). The acceleration pulse 33 is a driving source for the focus actuator section 16 to perform the inter-layer jump with respect to the target information record layer. The acceleration pulse 33 has a polarity corresponding to the jump direction of the focus actuator section 16, and predetermined pulse width and pulse height.

FIG. 12 shows a waveform of the focus drive signal generated on the basis of the output of the acceleration/deceleration signal generator 25 used for the inter-layer jump indicated by FIG. 11, and a waveform of the focus error signal FE generated by the subtracter 23 in case that the focus actuator section 16 is driven or actuated by the focus drive signal on the same time axis, wherein the case of jumping from the second information record layer to the first information record layer of the optical disc 1 (i.e. the backward jump) is indicated.

FIG. 13 shows a waveform of the focus drive signal generated on the basis of the output of the acceleration/deceleration signal generator 25 used for the inter-layer jump indicated by FIG. 11, and a waveform of the focus error signal FE generated by the subtracter 23 in case that the focus actuator section 16 is driven or actuated by the focus drive signal on the same time axis, wherein the case of jumping from the first information record layer to the second information record layer of the optical disc 1 (i.e. the forward jump) is indicated.

As understood from FIG. 12, since the focus servo is in the focus open condition at the time of starting the application of the acceleration pulse 33, the focus error signal FE is generated when the focus actuator section 16 is moved by the acceleration pulse 33.

Then, the controller 22 judges whether or not the level of the focus error signal FE exceeds a predetermined threshold value on the basis of the FZ signal supplied from the comparator 24 (Step S16). As this threshold value, the threshold value Th2 is utilized in case of the backward jump as shown in FIG. 12, while the threshold value TH1 is utilized in case of the forward jump as shown in FIG. 13.

If the level of the focus error signal FE exceeds the threshold value (Step S16: YES), the controller 22 stops the timer (Step S17). Next, the controller 22 calculates the time duration from the generation of the acceleration pulse to the time point when the level of the focus error signal exceeds the threshold value, so as to determine the calculated value as the deceleration waiting time. Then, the controller 22 selects the data as for the deceleration waiting time corresponding to the inter-layer distance which is the closest to the detected and stored inter-layer distance at the Step S3 in FIG. 9, and, with adopting the inter-layer distance as the parameter on the basis of the aforementioned experimentation result, calculates the optimum deceleration pulse width by comparing it with the data corresponding to the optimum deceleration pulse width stored as the relational expression with the deceleration waiting time as the parameter thereof (Step S18).

Incidentally, at the Step S18, as aforementioned, only the relational expressions may be stored in advance in the ROM etc. of the controller 22, one relational expression may be selected from among these stored relational expressions, and the pulse width may be calculated from this selected relational expression and the deceleration waiting time at the time of the inter-layer jump.

Next, the timer is restarted (Step S19). Then, the acceleration/deceleration signal generator 25 starts to generate the deceleration pulse having a predetermined pulse height to decelerate the focus actuator section 16 (Step S20).

After that, the controller 22 controls the output by the timer until the pulse width of the generated deceleration pulse becomes equal to the optimum deceleration pulse width calculated at the Step S18 i.e. , until the timer value (t) reaches the calculated pulse width (tw) (Step S21). Then, in case that it becomes equal to the optimum deceleration pulse width (Step S21: YES), the deceleration of the focus actuator section 16 is ended by stopping the output of the deceleration pulse (Step S22). By this, the controller 22 can drive the focus actuator section 16 to decelerate by the deceleration pulse 34 having the optimum deceleration pulse width. Then, the operation flow returns to the Step S11.

At this time, since the focus actuator section 16 approaches the position corresponding to the focus zero-cross point of the target information record layer in a condition where it is sufficiently decelerated, the controller 22 closes the focus servo on the target information record layer at the Step S11. The timing of drawing the close of the focus servo may be, as shown in FIG. 12, the timing when the threshold value Th2 is detected again, or may be another timing. By the processes described above, the certain inter-layer jump can be performed by the present embodiment.

As described above in detail, according to the present embodiment, it is possible to deal with the variation and unevenness of the inter-layer distances from the optical disc to the optical disc as well as the influence of the surface deflection of each optical disc, by moving the objective lens 16a of the optical pickup 3 correspondingly by use of the acceleration and deceleration signals, so that the reading light can be certainly focused onto the desired information record layer to be read, and the record information of the desired information record layer can be certainly read.

In the above described present embodiment, the multiple-layered optical disc 1 is the double-layered optical disc. However, the advantageous effect of the present embodiment can be achieved even if the multiple-layered optical disc 1 comprises three or more than three information record layers on one side thereof in which the inter-layer jump is performed between the adjacent information record layers.

Further, in order to make the automatic adjustment of the reproducing apparatus easier, the deceleration pulse having the constant pulse height is generated, and the optimum deceleration pulse width is formed by controlling the pulse width, in the above described embodiment. However, it is possible to control the pulse height to form the optimum deceleration pulse for performing the optimum deceleration, or it is also possible to control both of the pulse height and the pulse width.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing record information of a multiple-layered optical disc having a plurality of information record layers on each of which the record information is recorded, said apparatus comprising:

an optical pickup having a light source for emitting a reading light, an objective lens for condensing the emitted reading light onto one of the information record layers which is specified by a switch command for switching the information record layers to be read, a focus actuator for moving said objective lens in a focus direction perpendicular to the information record layers, and a light-detection device for detecting the reading light reflected by the specified one of the information record layers and outputting a light detection signal, so as to read the record information of the specified one of the information record layers;

a focus error generation device for generating a focus error signal indicating a relative distance between the specified one of the information record layers and said objective lens on the basis of the outputted light detection signal;

an acceleration/deceleration signal generator for generating and outputting to said focus actuator an acceleration signal to accelerate said objective lens in the focus direction and a deceleration signal to decelerate said objective lens in the focus direction;

an inter-layer distance measurement device for measuring an inter-layer distance between the information record layers of said multiple-layered optical disc; and a controller for measuring a time duration since the acceleration signal is generated by said acceleration/deceleration signal generator until the focus error signal reaches a predetermined threshold level, and for controlling said acceleration/deceleration signal generator in accordance with the switch command to set a magnitude of the deceleration signal on the basis of the measured inter-layer distance and the measured time duration.

2. An apparatus according to claim 1, wherein said inter-layer distance is a distance between one of the information record layers, the record information of which is being presently read by said optical pickup, and another of the information record layers, which is specified by the switch command to be nextly read.

3. An apparatus according to claim 1, wherein the magnitude of the deceleration signal is set by said controller on the basis of various relational expressions, which vary as the inter-layer distances vary and each of which employs the measured time duration as a parameter.

4. An apparatus according to claim 1, wherein said inter-layer distance measurement device measures the inter-layer distance on the basis of the focus error signal.

5. An apparatus according to claim 1, wherein said controller sets, as the magnitude of said deceleration signal, at least one of a height of the deceleration signal and an output time duration of the deceleration signal.

6. An apparatus according to claim 1, wherein said acceleration/deceleration signal generator generates a first pulse as the acceleration signal and a second pulse which polarity is opposite to that of the first pulse as the deceleration signal.

7. An apparatus according to claim 1, wherein said focus actuator comprises a focus coil for moving said objective lens in the focus direction.

8. An apparatus according to claim 1, further comprising a switch device for switching to one position to open a focus servo loop for said optical pickup and supply the acceleration and deceleration signals therethrough to said focus actuator, and switching to another position to close the focus servo loop.

9. An apparatus according to claim 1, further comprising a chopping wave generator for generating, to said focus actuator, a chopping wave to move said objective lens.

10. An apparatus according to claim 1, wherein said controller has a memory device for storing optimum deceleration signals with respect to various deceleration waiting time, which is a time duration since the acceleration signal is applied to said focus actuator until the deceleration signal is applied to said focus actuator, for each jump direction and each inter-layer distance in advance of reproducing said multiple layered optical disc.

\* \* \* \* \*